United States Patent [19]

Haese et al.

[11] 4,005,016
[45] Jan. 25, 1977

[54] APPARATUS FOR CONTINUOUSLY WITHDRAWING SOLIDS WHICH FORM A SEDIMENT IN A LIQUID

[75] Inventors: Egon Haese, Bochum; Hans Moll, Marl, both of Germany

[73] Assignee: Dr. C. Otto & Comp. G.m.b.H., Bochum, Germany

[22] Filed: July 7, 1975

[21] Appl. No.: 593,321

[30] Foreign Application Priority Data

July 12, 1974 Germany .......................... 2433598

[52] U.S. Cl. ............................. 210/268; 23/270 R
[51] Int. Cl.[2] ...................................... B01D 15/02
[58] Field of Search .......... 23/270 R; 210/33, 189, 210/268

[56] References Cited
UNITED STATES PATENTS

| | | | |
|---|---|---|---|
| 1,861,295 | 5/1932 | Bramwell | 210/189 |
| 2,683,109 | 7/1954 | Norris | 210/268 |
| 3,137,651 | 6/1964 | DeLara et al. | 210/189 |
| 3,715,868 | 2/1973 | Biasi | 210/268 |
| 3,738,814 | 6/1973 | Cloete et al. | 23/270 R |

*Primary Examiner*—Charles N. Hart
*Assistant Examiner*—Ivars Cintins
*Attorney, Agent, or Firm*—Brown, Murray, Flick & Peckham

[57] ABSTRACT

This disclosure pertains to an apparatus within a container wherein solid particles of the type that form a sediment in a liquid, are withdrawn from a liquid-filled processing chamber at the upper side of a funnel-shaped plate into a liquid-filled collecting chamber below the plate. In one embodiment, the funnel-shaped plate includes a central discharge nozzle that forms an annular discharge gap by extending downwardly within the side walls of a bell-shaped chamber that is inverted and contains a mushroom-shaped distributor supported above its bottom wall by a liquid supply pipe. The top surface of the mushroom-shaped distributor has a conical shape with the apex extending upwardly to the terminal end of the discharge nozzle.

In a second embodiment, the annular opening in the funnel-shaped plate contains a cylindrical hood to form an annular space that is closed at its bottom by an oblique wall forming part of a fluid discharge chamber which delivers fluid upwardly along a ring-shaped sleeve that projects into the hood and forms an annular discharge gap therewith for the solid particles that pass downwardly within the sleeve into the underlying collecting chamber.

10 Claims, 5 Drawing Figures

APPARATUS FOR CONTINUOUSLY WITHDRAWING SOLIDS WHICH FORM A SEDIMENT IN A LIQUID

BACKGROUND OF THE INVENTION

This invention relates to an apparatus wherein solids which have formed a sediment in liquids are continuously withdrawn from a processing chamber into a collecting chamber which is also filled with fluid. The solids can be, for example, ion exchangers, catalysts, active carbon or the like. More particularly, the present invention relates to such an apparatus to discharge a mixture of liquid and solid into the collecting chamber from where the liquid is supplied to a pump, and the solid is discharged for subsequent supply to a reactivation unit after which it is returned to the processing chamber.

As is known, in prior art withdrawal devices the solids are conveyed from a processing chamber to an underlying second chamber. Most such withdrawal devices are operatively controlled on the principle of employing a movable slide or valve. A drive mechanism, located externally of the chamber, is mechanically connected to the movable slide or valve. In other known forms of withdrawal devices, the solid is entrained by a jet of liquid and the device operates on an injector principle. Such known devices have a number of disadvantages which are summarized by the following. When there is a large throughput of solids in the processing chamber, the efficiency of the process often depends on the losses of solid material. In a typical example, losses of solids affects the efficiency of continuously operating active carbon processes used for removing organic substances from waste water. The cost of active carbon is relatively high and in view of its relatively low mechanical strength, the active carbon must be treated and handled in a relatively gentle manner. Most of the losses result from the mechanical destruction of particles of active carbon. It is therefore very important to insure that, in the region of the moving liquid phase, the liquid to carbon ratio is sufficiently great to insure that the particles of carbon do not rub against one another or against other parts of the apparatus at high speeds. The active carbon in the liquid phase, i.e., the mixture of active carbon and liquid, has a small angle of repose, usually below 15°. Therefore, in known apparatus, valve seats, slides or closure plates, must be located near the outlet pipe which must have a minimum diameter due to the self-blocking effect of the active carbon. Furthermore, the active carbon which is discharged must flow from these devices when there is a low fluid to carbon ratio. This inevitably results in prolonged contact on the particles with one another and with the closure element. When the valve or slide member closes, particles of carbon are caught between the closure elements and the outlet pipe. Mechanically driven closure elements are subject to natural wear and such elements must be made of special materials when the fluids are corrosive. To insure reliable operation, the entire device requires continual maintenance.

In the case of continuously operating plants, it is usually necessary to determine the amount of solids in circulation. Experience has shown that, in the case of known withdrawal devices, it is impossible to plot or otherwise prepare a simple curve from which, for example, the amounts of discharged solids can be read off as a function of the valve or slide plate position. Measuring devices required for this purpose are separate, external, and very expensive.

SUMMARY OF THE INVENTION

It is an object of the present invention to provide an apparatus which will alleviate the aforementioned disadvantages of known devices and, more particularly, to reduce to a minimum the losses of solids when discharged from a chamber.

It is a further object of the present invention to provide an apparatus which is constructed and arranged in a manner so as to eliminate the need for mechanically-driven closure plates or the like.

It is still a further object of the present invention to provide an apparatus to control withdrawal of solid particles from a fluid-filled processing chamber in a circulating system for the solids whereby the amount of solids in circulation can be determined by simple methods.

According to one embodiment of the present invention, there is provided an apparatus to continuously withdraw solid particles from the liquid-filled processing chamber into a liquid-filled collecting chamber, the solids being of the type which form a sediment in liquids, the apparatus comprising the combination of a vertically extending container, a funnel-shaped plate extending in an oblique downward direction within the bottom of the container in a manner to thereby define in the container a processing chamber above the plate and a collecting chamber below the plate, the funnel-shaped plate including a downwardly extending central outlet nozzle, a bell-shaped chamber having a bottom wall joined with upwardly extending side walls forming an open top, the bell-shaped chamber being disposed within the collecting chamber to centrally receive the discharge end of the outlet nozzle, a mushroom-shaped distributor spaced above the bottom wall of the bell-shaped chamber while spaced inwardly from the side walls thereof, the distributor having a generally cone-shaped upper surface with the apex thereof lying at the discharge end of the outlet nozzle, the upper surface of the distributor forming an angle with the horizontal, which angle is greater than the angle of repose of the solids passing through the container, and a conveying pipe projecting upwardly from the bottom wall of the bell-shaped chamber to the distributor, the conveying pipe having fluid discharge openings located within the space between the distributor and the bottom wall of the bell-shaped chamber.

According to a further feature of the present invention, the aforesaid apparatus is more specifically defined by dimensional parameters given by the following expressions:

$$\frac{D_1 - 2S}{d}$$

lies within the range of 15 to 40 and preferably 20 to 30, $$\frac{D_2 - D_1}{2d}$$

lies within the range of 3 to 10 and preferably 5 to 6, $$\frac{H_4}{d}$$

lies within the range of 6 to 10 and preferably 8 to 12, and $$\frac{D_2 - D_3}{2d} = 1.2 \times d,$$

where:
- $D_1$ = the diameter of the outlet nozzle,
- $D_2$ = the internal diameter defined by the side wall of the bell-shaped chamber,
- $D_3$ = the maximum diameter of the mushroom-shaped distributor,
- $d$ = the diameter of the solid particles passing from the processing chamber into the collecting chamber,
- $S$ = the wall thickness of the outlet nozzle, and
- $H_4$ = the vertical distance between the mushroom-shaped distributor and the discharge end of the outlet nozzle at the outer periphery thereof.

According to a further embodiment of the present invention, there is provided apparatus for continuously withdrawing solid particles from a liquid-filled processing chamber into a liquid-filled collecting chamber wherein the solid particles are of the type which form a sediment in the liquids, the apparatus comprising the combination of a vertically-extending container, a conical wall with a central opening within the container to thereby define a processing chamber above the wall and a collecting chamber below the wall, a cylindrical hood having an oblique upper wall joined with a hood side wall disposed within the central opening of the conical wall to form an annular space therebetween, an oblique annular surface extending internally of the container to form a bottom boundary to the annular space, a ring-like sleeve projecting upwardly from the annular space and into the space enclosed by the cylindrical hood to form an annular discharge space therebetween, the lower terminal end of the sleeve lying within the collecting chamber, a liquid supply line coupled with a distribution chamber defined to include the annular space enclosed by the cooperative relation between the oblique annular surface and the container, a wall member having fluid-conducting apertures therein arranged to form a bottom for the distribution chamber, and means forming a fluid discharge chamber below the distribution chamber to conduct fluid passing through the apertures in the wall member in an upward direction along the sleeve and into the annular discharge space formed within the hood.

According to a further feature of the present invention, the aforesaid further embodiment is more specifically defined by dimensional parameters given by the following expressions:

| | |
|---|---|
| $\frac{D_7-(D_4+2S)}{2d}$ | lies within the range of 15 to 40 and preferably 20 to 30, |
| $\frac{D_4-D_5}{2d}$ | lies within the range of 3 to 10 and preferably 5 to 6, |
| $\frac{H_4}{d}$ | lies within the range of 6 to 16 and preferably 8 to 12, and |

-continued

| | |
|---|---|
| $\frac{D_6-D_5}{2d}$ | $= 1.2 \times d,$ | where:
- $D_4$ = the inside diameter of the cylindrical hood,
- $D_5$ = the outside diameter of the annular ring-like sleeve,
- $D_6$ = the diameter of the annular opening through the distributor chamber,
- $D_7$ = the inside diameter of the central opening in the conical wall,
- $d$ = the diameter of the solid particles passing from the processing chamber into the collecting chamber,
- $S$ = the wall thickness of the side wall of the cylindrical hood, and
- $H_4$ = the vertical distance between the oblique annular surface and the lower end of the side wall of the hood.

From the foregoing as well as the following description, it will be apparent to those skilled in the art that the present invention eliminates losses through mechanical destruction of the conveyed solids and that solid particles cannot penetrate between closure elements or the like. Mechanically-driven closure elements are eliminated from the apparatus of the present invention.

These features and advantages of the present invention as well as others will be more readily understood when the following description is read in light of the accompanying drawings, in which.

Figure 1:
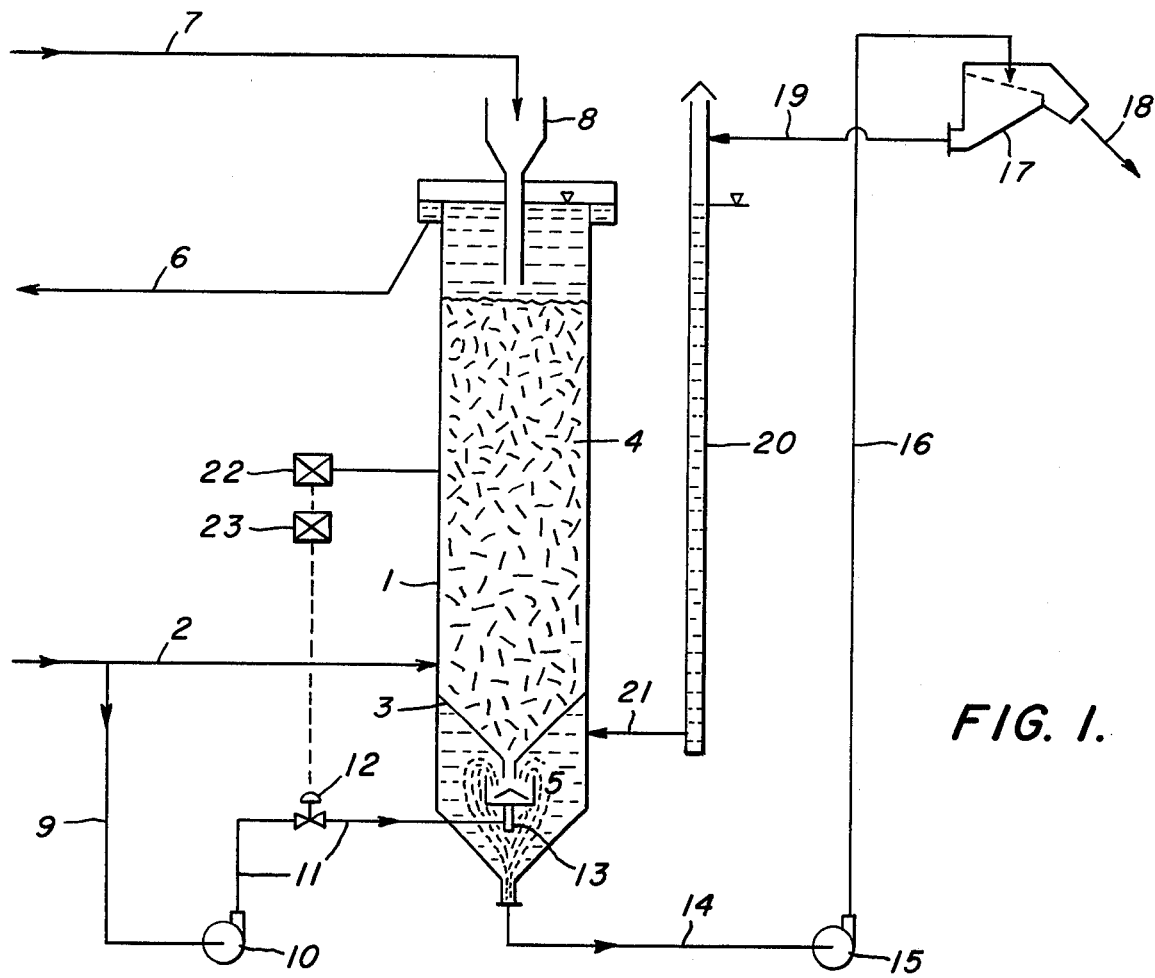
FIG. 1 is a schematic illustration of a plant embodying the features of the present invention for the continuous withdrawal of solids.

The plant shown in FIG. 1 includes a vertically-extending and generally cylindrical container 1 which receives liquid to be processed with solids by way of pipeline 2. For the purpose of this detailed description, the solids will be referred to as active carbon. However, the solid may take the form of ion exchangers, catalysts, and like substances as described hereinbefore. The pipeline 2 is connected with the interior of a container at an elevation above an oblique plate 3 which is secured to the inside wall of the container and divides it into a processing chamber 4 lying above the oblique plate and a collecting chamber 5 that underlies the oblique plate. The liquid, after purification, is discharged from the container by pipeline 6. Fresh or reactivated active carbon is supplied through pipeline 7 and funnel 8. A very small part of the liquid for processing is withdrawn from line 2 in order to convey the active carbon. This withdrawn portion of liquid is conveyed by pipeline 9 to a pump 10 from where the liquid is delivered by pipeline 11 having a regulating valve 12 therein to a conveying pipe 13. The conveying pipe is shown in greater detail by FIG. 2.

The liquid delivered by conveying pipe 13 is used for conveying active carbon as will be explained in greater detail hereinafter. The active carbon falls into the collecting chamber 5 from where it is conveyed together with large quantities of liquid by pipeline 14 to a pump 15. A delivery pipeline 16 conducts the solid-liquid mixture to a separating device 17 wherein solid active carbon is separated from the liquid. The solid is delivered by pipeline 18 to a reactivation unit and the separated liquid is delivered by line 19 to a vertical pipe 20 for return flow back into the collecting chamber by pipeline 21.

The withdrawal of active carbon is controllably adjusted in a dependent relation on the quantity of treated liquid. A small amount of liquid is removed at a given height from the container 1 which contains active carbon. The purity of the liquid is determined at this elevation by an automatic analytical apparatus 22 which is of the known type used, for example, to measure the content of organic carbon known as the TOC content (Total Organic Carbon). A controller 23 coupled with the analytical apparatus 22 controls the regulating valve 12 in a manner to insure that the amount of active carbon withdrawn is such that a given degree of purity to the liquid is maintained at the elevation of the container forming the measuring point.

Figure 2:
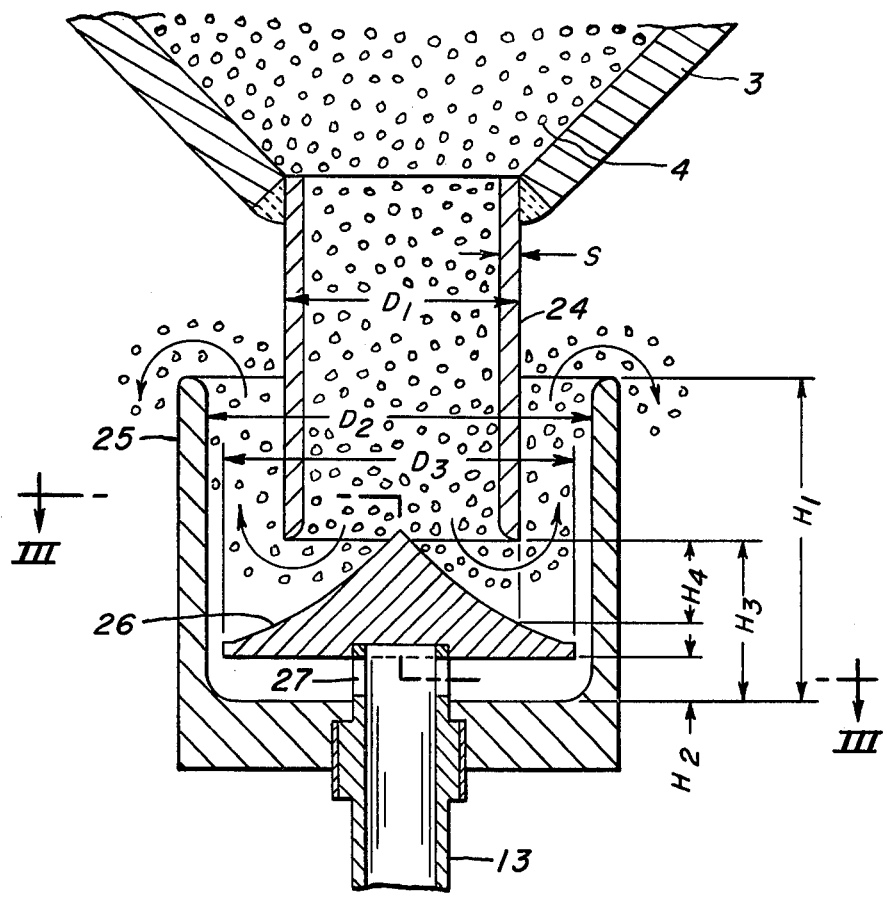
FIG. 2 is an enlarged view of a discharge apparatus incorporated in the plant illustrated by FIG. 1 and representing a first embodiment of the present invention.
Figure 3:
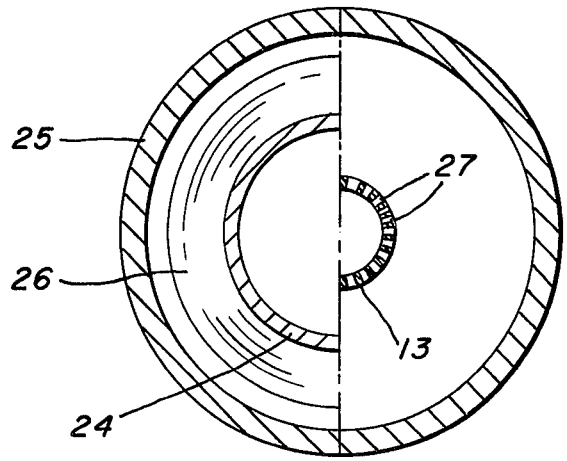
FIG. 3 is a sectional view taken along lines III—III of FIG. 2.

As clearly shown in FIGS. 1 and 2, the actual discharge apparatus of the present invention according to a first embodiment thereof includes the conical plate 3 having a central annular opening which is extended downwardly by a discharge nozzle 24. As shown in FIG. 2, the nozzle has an outer diameter $D_1$ and a wall thickness S. The nozzle 24 projects downwardly into an upwardly open bell chamber 25 which is located within the collecting chamber 5 and filled with fluid. An annular chamber is formed between the nozzle 24 and the side walls of chamber 25 which defines an inner diameter $D_2$. The conveyor pipe 13 passes through the bottom wall of the bell-shaped chamber 25 at the center thereof and extends upwardly into a threadedly connected relation with a mushroom-shaped distributor 26. The distributor 26 is disposed at a distance above the bottom of the chamber 25 and uniformly spaced inwardly from the side walls thereof. The upper surface of the mushroom-shaped distributor has a generally conical shape which is constructed and positioned in such a manner that the apex thereof lies in the middle of the outlet nozzle 24 at its terminal and discharge ends. The distributor 26 has an outer diameter $D_3$ so that an annular gap having a width defined by the expression:

$$\frac{D_2-D_3}{2}$$

is formed between the outer periphery of the distributor and the side wall of chamber 25. The cone-shaped upper surface of the distributor is inclined to the horizontal at an angle which is greater than the angle of repose of the solids to be withdrawn from the container for processing.

In FIG. 2, $H_4$ represents the vertical distance between the distributor and the end of the outlet nozzle at its outer periphery and $H_2$ represents the distance between the bottom of the bell-shaped chamber and the distributor. Distance $H_3$ is defined as the extended distance between the bottom end of nozzle 24 and the bottom wall of the bell-shaped chamber. The internal height of the bell-shaped chamber is represented by $H_1$. Liquid conducted through conveyor pipe 13 flows therefrom through lateral apertures 27 in its side wall formed in the space between the bottom of the bell chamber and the distributor. The liquid passing from these apertures is deflected upwardly at the side wall of the bell-shaped chamber through the annular gap between the bell-shaped chamber and the distributor.

In the initial inoperative state of the apparatus of the present invention, no liquid flows through conveyor pipe 13 and the angle of repose in chamber 25 is such that no solid is conveyed from chamber 4 of the container. Conveying liquid supplied through pipe 13 flows as just described through the apertures 27 into the annular space between chamber 25 and nozzle 24. When the flow speed in the annular chamber exceeds a certain valve, the solids which have flowed downwardly from the nozzle 24 into the chamber are loosened. When the speed further increases to a value which exceeds the turbulence point, the solids are discharged from the top edge of the side wall of chamber 25 and then flow into the collecting chamber 5.

Figure 5:
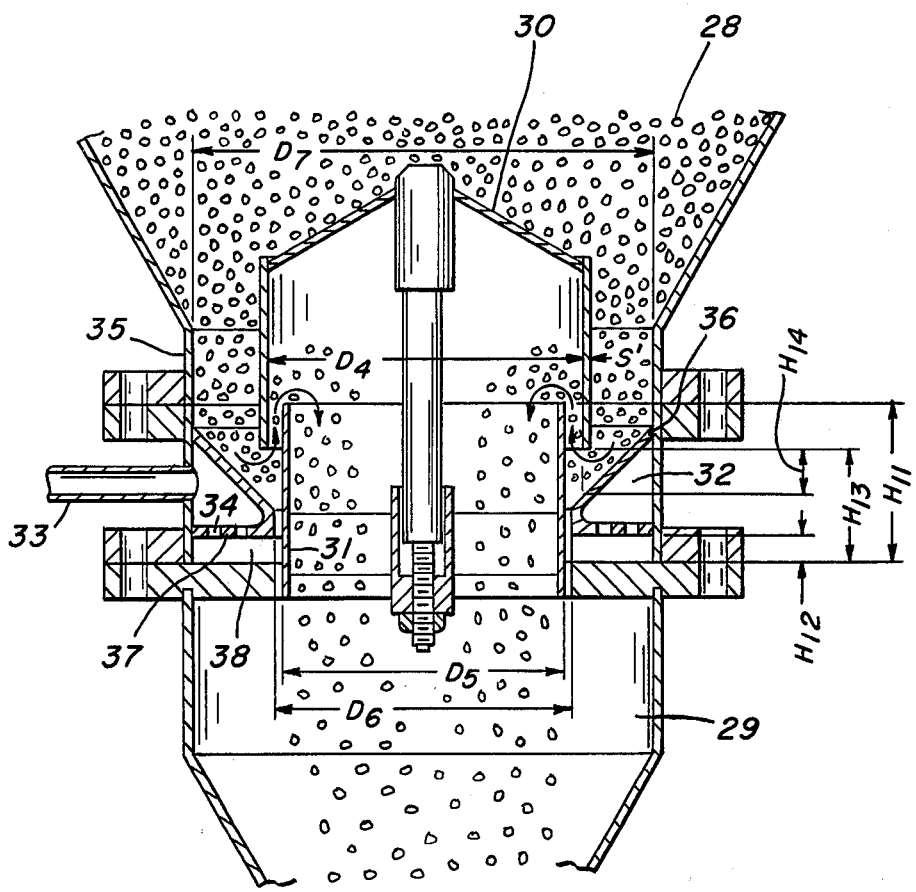
FIG. 5 is an enlarged sectional view similar to FIG. 2 but illustrating a second embodiment of the present invention.

FIG. 5 illustrates a second embodiment of the present invention which is particularly advantageous for use in plants having a large throughput capacity of solids. The embodiment of FIG. 5 functions in a basically corresponding manner to the embodiment of FIG. 2. As illustrated in FIG. 5, a processing chamber 28 and an underlying collecting chamber 29 are parts of the cylindrical container 1 shown in FIG. 1. The processing chamber 28 has a conical bottom wall which merges into the collecting chamber 29. The actual withdrawal apparatus is annular in shape. An annular space is formed by a hood 30 which has a downwardly-extending side wall that is open at its bottom edge and a conically-shaped top wall which extends upwardly in an oblique direction. The inside diameter of the cylindrical wall of the hood is identified in FIG. 5 by reference numeral $D_4$. The container 1 includes an internal cylindrical wall 35 of a reduced diameter denoted in FIG. 5 by numeral $D_7$. Wall 35 extends downwardly from the end of the tapered portion of the container and forms an annular space with the outer wall of the hood 30. This annular space is bounded at its bottom by the surface 36 of an oblique annular wall that extends obliquely downward and inwardly from the container wall toward a ring-like sleeve 31 which projects vertically into the hollowed-out interior of the hood 30. The ring-like sleeve 31 projects downwardly whereby its terminal edge lies within the collecting chamber 29. An annular gap is formed between the ring 31 and the aperture formed by the inner diameter of the wall forming the oblique surface 36. This annular gap has a width defined by the expression:

$$\frac{D_6-D_5}{2}$$

where, as indicated in FIG. 5, $D_5$ represents the outside diameter of the ring-like sleeve 31 and $D_6$ represents the internal diameter of the aperture formed in the oblique surface 36. This oblique surface cooperates with the container wall to form a distribution chamber 32 that receives the terminal end of a liquid supply pipeline 33. The oblique surface 36 is joined with an annular wall member 37 which forms a bottom to the distribution chamber 32. The wall member 37 includes aperture openings 34 to conduct fluid from the distribution chamber into a fluid discharge chamber 38 located below it which, in turn, conducts the liquid in an upward direction along the outer surface of the ring-like sleeve 31 through the gap which it forms with oblique surface 36 and then upwardly through the gap formed between the ring-like sleeve 31 and the hood 30.

The apparatus of the second embodiment of the present invention operates in basically the same manner as that previously described in regard to the first embodiment. The solid particles which have collected within the cylindrical wall 35 according to the FIG. 5 embodiment, remains stationary until the liquid flowing upwardly along the ring-like sleeve 31 from the pipeline 33 exceeds a certain speed or flow rate. The solid particles then become entrained in the liquid flowing through the annular space between the hood 30 and the ring-like sleeve 31 from where they are carried into the collecting chamber 29.

Experiments have been conducted with conveying apparatus of various sizes according to the present invention and these experiments have shown that when the aforementioned relationship of its parts and dimensional parameters are adhered to there is always a direct relation between the amount of conveyed solids and the amount of conveying liquid. In the embodiment illustrated in FIG. 5, $H_1$ is the distance between the bottom of the chamber 38 and the top edge of the ring-like sleeve 31. The dimension $H_2$ corresponds to the height of the chamber 38 and the dimension $H_3$ is the distance between the bottom of the chamber 38 and the bottom edge of the hood 30. Dimension $H_4$ corresponds to the maximum internal cross section between the bottom edge of the hood 30 and the oblique surface 36.

A specific example is given below of a conveying apparatus according to the embdiment illustrated in FIGS. 1 and 2 wherein the dimensional parameters are given as follows:

$D_1$ = 60 millimeters
$D_2$ = 74 millimeters
$D_3$ = 70 millimeters
$H_1$ = 60 millimeters
$H_2$ = 10 millimeters
$H_3$ = 24 millimeters
$H_4$ = 10 millimeters The device built with these dimensional parameters was used for conveying active carbon in the form of extruded cylinders having an average diameter of 1.6 millimeters and an average length of 3.5 millimeters. The bulk weight of the carbon was 500 grams per liter. The conveying liquid was water and the quantity of liquid was varied between 0 and 400 liters per hour.

Figure 4:
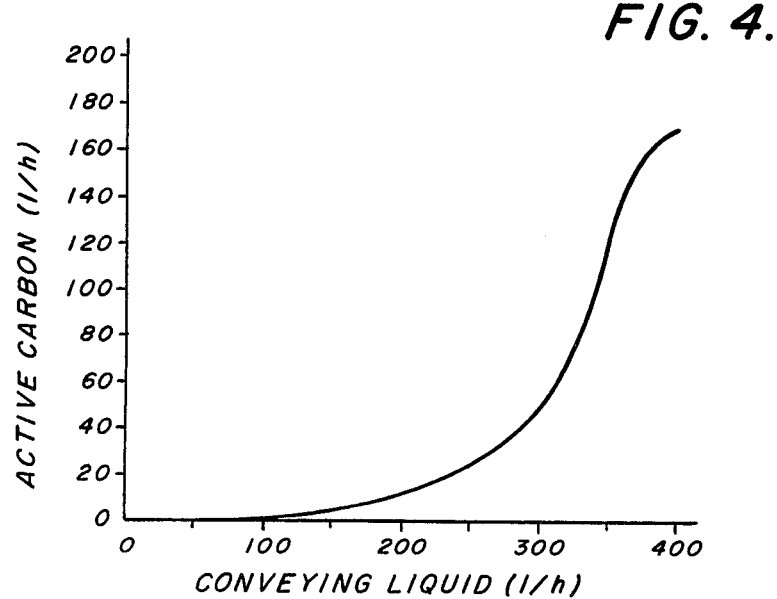
FIG. 4 is a graph illustrating the rate of withdrawing solids in a dependent relation to the flow rate of conveying liquid.

FIG. 4 consists of a graph to illustrate the amount of discharged active carbon as a function of the amount of conveying liquid. As clearly shown by this graph, the conveying process begins when the liquid flows at a rate of approximately 60 liters per hour and this corresponds to a flow rate of twice the turbulence point in the annular space. When the flow rate of conveying liquid is increased to 400 liters per hour, the reversal point is reached, i.e., the maximum amount of active carbon conveyed is 170 liters per hour. In the relevant region of the graph which lies between 20 and 170 liters per hour conveying rate of active carbon, an evaluation of this graph will demonstrate that the curve is closely approximate to a third-order polynomial. The maximum error is 0.7%. Accordingly, the amount of active carbon in circulation can be measured in a technically satisfactory manner. This same characteristic can be used for continuously adjusting the withdrawal of active carbon in a dependent relation to the purity of the liquid being processed. Long-term tests conducted using the devices of the present invention were made to measure the abrasion to the parts of the apparatus and no measurable abrasion was found.

In both embodiments, the flow of liquid in pipeline 11 is controlled so as not to exceed a maximum flow rate in the annular discharge spaces. Thus, in FIG. 2, the maximum desired flow speed of liquid-solid mixture in the annular space between the outlet nozzle and the bell-shaped chamber is not more than 30 times the speed at which turbulent flow occurs to the mixture. In regard to FIG. 5, the maximum desired flow speed of liquid-solid mixture in the annular space between the hood and the ring-like sleeve is not more than thirty times the speed at which turbulent flow occurs to the mixture.

Although the invention has been shown in connection with certain specific embodiments, it will be readily apparent to those skilled in the art that various changes in form and arrangement of parts may be made without departing from the spirit and scope of the invention.

We claim as our invention:

1. An apparatus to continuously withdraw solid particles from a liquid-filled processing chamber into a liquid-filled collecting chamber, said solids forming a sediment in the liquid, said apparatus comprising the combination of:

a vertically-extending container including means to introduce solid particles to said container, means to withdraw solid particles from from said container, means to introduce liquid to said container and means to withdraw liquid from said container a funnel-shaped plate extending in an oblique downward direction within the bottom portion of said container in a manner to thereby define in said container a processing chamber above said plate and a collecting chamber below said plate, said funnel-shaped plate including a downwardly-extending central outlet nozzle, an inverted bell-shaped chamber having a bottom wall joined with an upwardly-extending side wall forming an open top, the bell-shaped chamber being disposed within said collecting chamber centrally below the discharge end of said outlet nozzle, a mushroom-shaped distributor spaced above the bottom wall of said bell-shaped chamber and spaced inwardly from the side walls thereof, the distributor having a generally cone-shaped upper surface with the apex thereof lying at the discharge end of said outlet nozzle, the upper surface of said distributor being inclined at an angle with respect to the horizontal which angle is greater than the angle of repose of the solids passing through the container, and a conveying pipe projecting upwardly through the bottom wall of the bell-shaped chamber to said distributor, the conveying pipe having fluid discharge openings located within the space between said distributor and the bottom wall of said bell-shaped chamber.

2. The apparatus according to claim 1 wherein said elongated container has a generally cylindrical shape.

3. The apparatus according to claim 1 further comprising liquid and solid particles in said processing chamber and wherein the expressions, $$\frac{D_1-2S}{d}$$

lies within the range of 15 to 40, $$\frac{D_2-D_1}{2d}$$

lies within the range of 3 to 10, $$\frac{H_4}{d}$$

lies within the range of 6 to 16, and $$\frac{D_2-D_3}{2d} = 1.2 \times d,$$

where:
$D_1$ = the diameter of said outlet nozzle,
$D_2$ = the internal diameter defined by the side wall of said bell-shaped chamber,
$D_3$ = the outer diameter of said mushroom-shaped distributor,
$d$ = the diameter of solid particles passing from said processing chamber into said collecting chamber,
$S$ = the wall thickness of said outlet nozzle, and
$H_4$ = the vertical distance between said mushroom-shaped distributor and the discharge end of said outlet nozzle at the outer periphery thereof.

4. The apparatus according to claim 3 further comprising means to control the flow of liquid in said conveyor pipe in a manner such that the maximum flow speed in the annular space between said central outlet nozzle and said bell-shaped chamber does not exceed thirty times the speed at which there occurs a turbulent flow to the liquid-solid mixture.

5. The apparatus according to claim 3 wherein said expressions are further defined whereby:

$$\frac{D_1-2S}{d}$$

lies within the range of 20 to 30, $$\frac{D_2-D_1}{2d}$$

lies within the range of 5 to 6, and $$\frac{H_4}{d}$$

lies within the range of 8 to 12.

6. An apparatus to continuously withdraw solid particles from a liquid-filled processing chamber into a liquid-filled collecting chamber, said solid forming a sediment in the liquid, said apparatus comprising the combination of:
a vertically-extending container including means to introduce solid particles to said container, means to withdraw solid particles from from said container, means to introduce liquid to said container and means to withdraw liquid from said container,
a conical wall with a central opening within said container to thereby define a processing chamber above said wall and a collecting chamber below said wall,
a cylindrical hood having an oblique upper wall joined with a hood side wall disposed within the central opening of said conical wall to form an annular space therebetween,
an oblique annular surface extending internally of said container to form a bottom boundary to said annular space,
a ring-like sleeve projecting upwardly from said annular space and into the space enclosed by said cylindrical hood to form an annular discharge space therebetween, the lower terminal end of said sleeve being within said collecting chamber,
a liquid supply line coupled with a distribution chamber defined to include the annular space enclosed by the cooperative relation between said oblique annular surface and said container,
a wall member having fluid conducting apertures therein arranged to form a bottom for said distribution chamber, and
means forming a fluid discharge chamber below said distribution chamber to conduct fluid passing through the apertures in said wall member in an upward direction along said sleeve and into said annular discharge space formed with said hood.

7. The apparatus according to claim 6 wherein said vertically-extending container has a generally-cylindrical shape.

8. The apparatus according to claim 6 further comprising liquid and solid particles in said processing chamber and wherein the expressions, $$\frac{D_7-(D_4+2S)}{2d}$$

lies within the range of 15 to 40, $$\frac{D_4-D_5}{2d}$$

lies within the range of 3 to 10, $$\frac{H_4}{d}$$

lies within the range of 6 to 16, and $$\frac{D_6-D_5}{3d} = 1.2 \times d$$

where:
$D_4$ = the inside diameter of said cylindrical hood,
$D_5$ = the outside diameter of said ring-like sleeve,
$D_6$ = the internal diameter of the annular opening defined by said distribution chamber, $D_7$ = the inside diameter of the central opening in said conical wall, $d$ = the diameter of the solid particles passing from said processing chamber into said collecting chamber, $S$ = the wall thickness of the side wall of said cylindrical hood, and $H_4$ = the vertical distance between said oblique annular surface and the lower end of the side wall of said hood.

9. The apparatus according to claim 8 further comprising means to control the flow of liquid in said liquid supply line such that the maximum flow speed in the annular space between said sleeve and said hood does not exceed thirty times the speed at which there occurs a turbulent flow to the liquid-solid mixture.

10. The apparatus according to claim 8 wherein said expressions are further defined whereby:

$$\frac{D_7-(D_4+2S)}{2d}$$

lies within the range of 20 to 30, $$\frac{D_4-D_5}{2d}$$

lies within the range of 5 to 6, and $$\frac{H_4}{d}$$

lies within the range of 8 to 12.

* * * * *